No. 835,756. PATENTED NOV. 13, 1906.
J. C. HUTCHISON.
MACHINE FOR MAKING PIES.
APPLICATION FILED JULY 20, 1905.
8 SHEETS—SHEET 3.
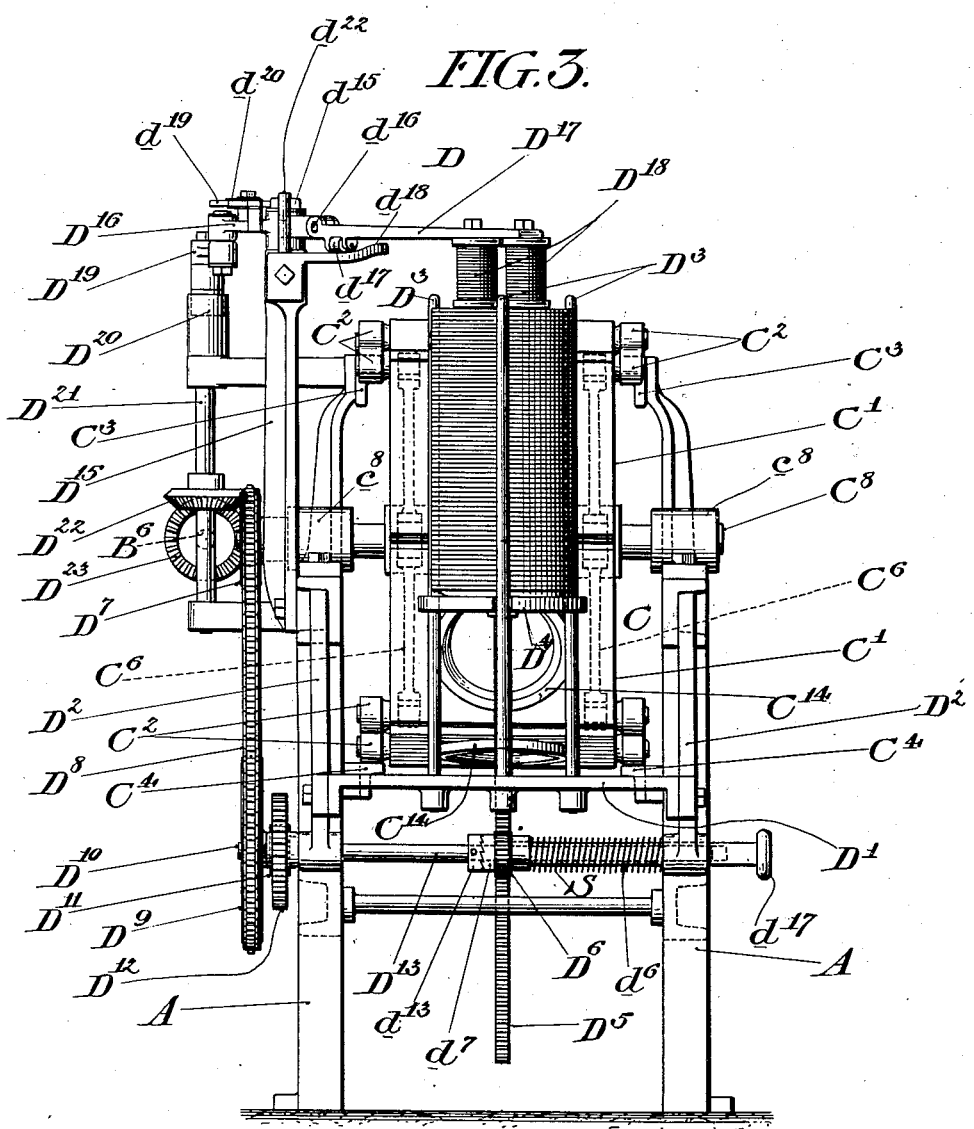
FIG. 3.
WITNESSES:
Norman W. Elliott.
David Ahamson
INVENTOR
Joseph C. Hutchison
BY
ATTORNEY.

No. 835,756. PATENTED NOV. 13, 1906.
J. C. HUTCHISON.
MACHINE FOR MAKING PIES.
APPLICATION FILED JULY 20, 1905.

8 SHEETS—SHEET 4.

WITNESSES:
Norman U. Elliott.
David Abramson

INVENTOR
Joseph C. Hutchison
BY
Lang S. Williams
ATTORNEY.

No. 835,756. PATENTED NOV. 13, 1906.
J. C. HUTCHISON.
MACHINE FOR MAKING PIES.
APPLICATION FILED JULY 20, 1905.

8 SHEETS—SHEET 6.

WITNESSES:
Norman U. Elliott.
David Abramson

INVENTOR
Joseph C. Hutchison
BY
David S. Williams
ATTORNEY.

No. 835,756. PATENTED NOV. 13, 1906.
J. C. HUTCHISON.
MACHINE FOR MAKING PIES.
APPLICATION FILED JULY 20, 1905.

8 SHEETS—SHEET 8.

WITNESSES:
Norman B. Elliott.
David Abramson

INVENTOR
Joseph C. Hutchison.
BY
ATTORNEY.

UNITED STATES PATENT OFFICE.

JOSEPH C. HUTCHISON, OF PHILADELPHIA, PENNSYLVANIA.

MACHINE FOR MAKING PIES.

No. 835,756.  Specification of Letters Patent.  Patented Nov. 13, 1906.

Application filed July 20, 1905. Serial No. 270,473.

*To all whom it may concern:*

Be it known that I, JOSEPH C. HUTCHISON, a citizen of the United States, residing at Philadelphia, in the county of Philadelphia and State of Pennsylvania, have invented certain new and useful Improvements in Machines for Making Pies, of which the following is a specification.

My invention relates to that class of pie-making machines described and claimed in Letters Patent granted to David S. Williams, assignor to Joseph C. Hutchison, No. 740,346, dated September 29, 1903, and Letters Patent No. 778,295, dated December 27, 1904, as also Letters Patent granted to me, No. 786,816, dated April 11, 1905.

My present invention embodies improvements in the plate-feeding mechanism, the mechanism for forming the upper and lower pie-crusts, the filler mechanism, and in addition to these other details of construction which will be hereinafter fully described.

The essential features of my invention are, first, the construction of a plate-feeding mechanism which will handle plates which have become bent or twisted by use and which heretofore it has been found necessary to straighten by an independent device before placing them in position to be fed by a mechanism of the type shown and described in the patents above referred to; second, to provide means whereby the plungers may be more uniformly heated; third, to provide a filler mechanism which will more thoroughly unite the fluid and solid mass of the filler before its delivery; fourth, to provide means for preventing the dough from adhering to the several devices by which it is acted upon, and, fifth, to provide means for ejecting the finished product from the conveyer.

The characteristic features of my present invention will be more fully understood by reference to the accompanying drawings, in which—

Figure 1:
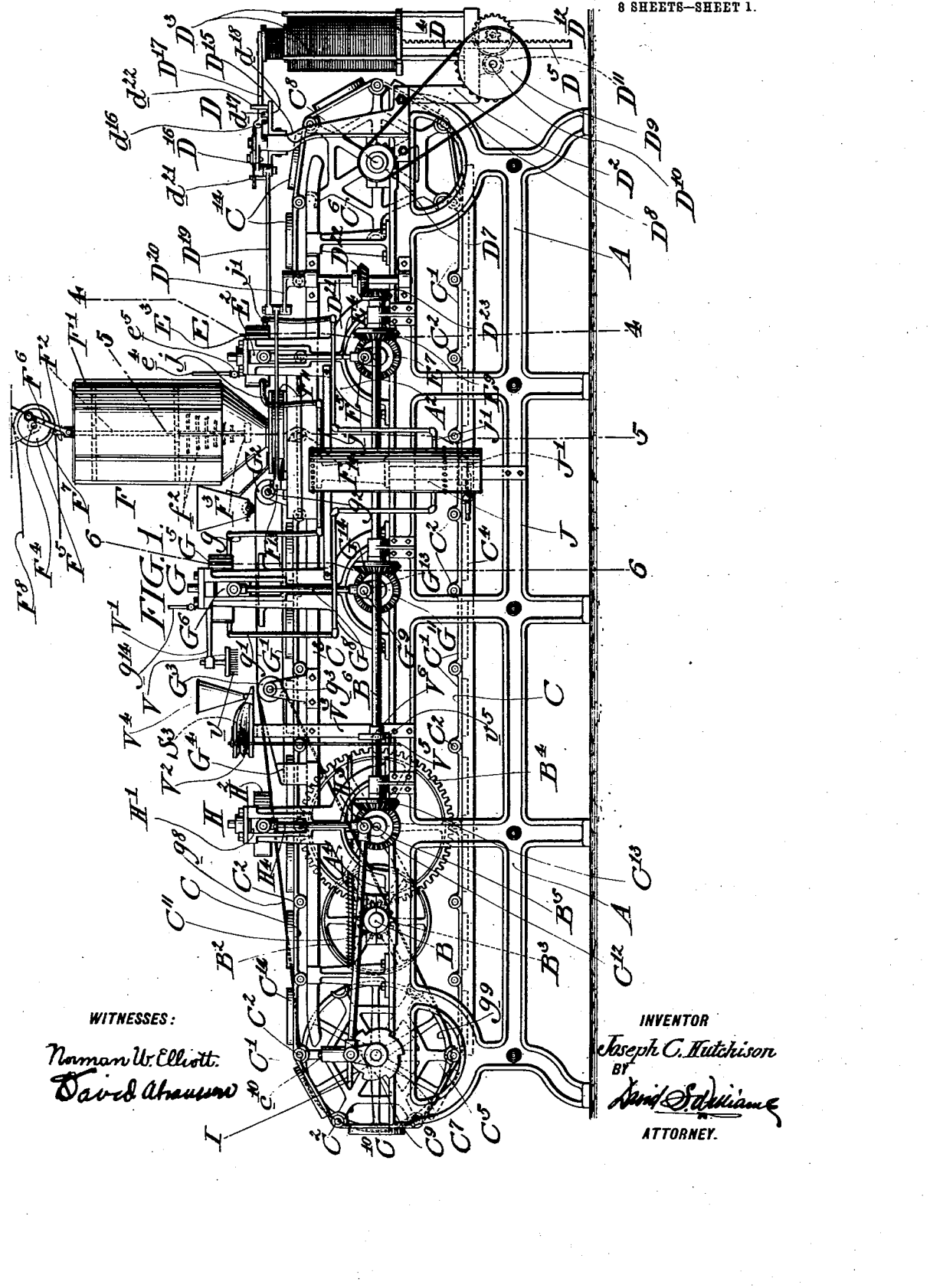
Figure 2:
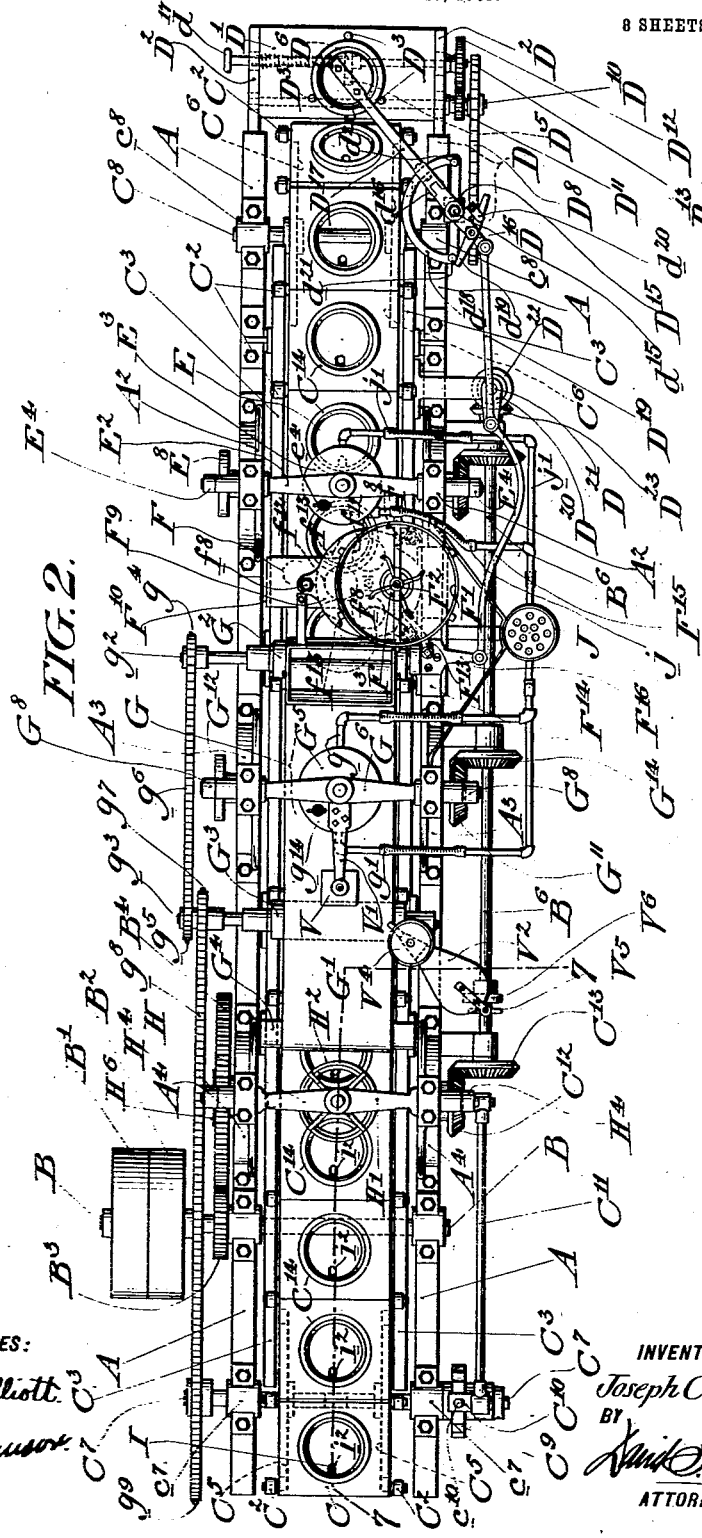
Figure 4:
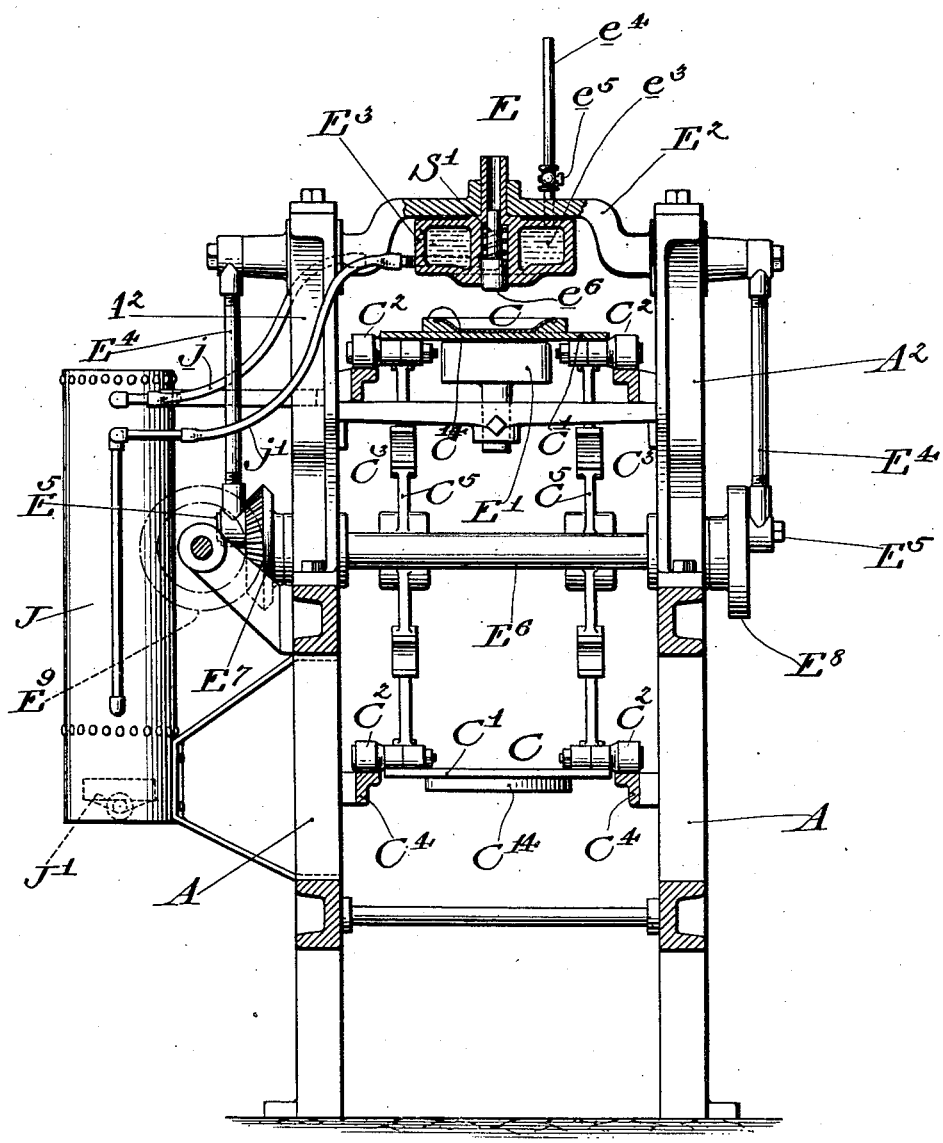
Figure 5:
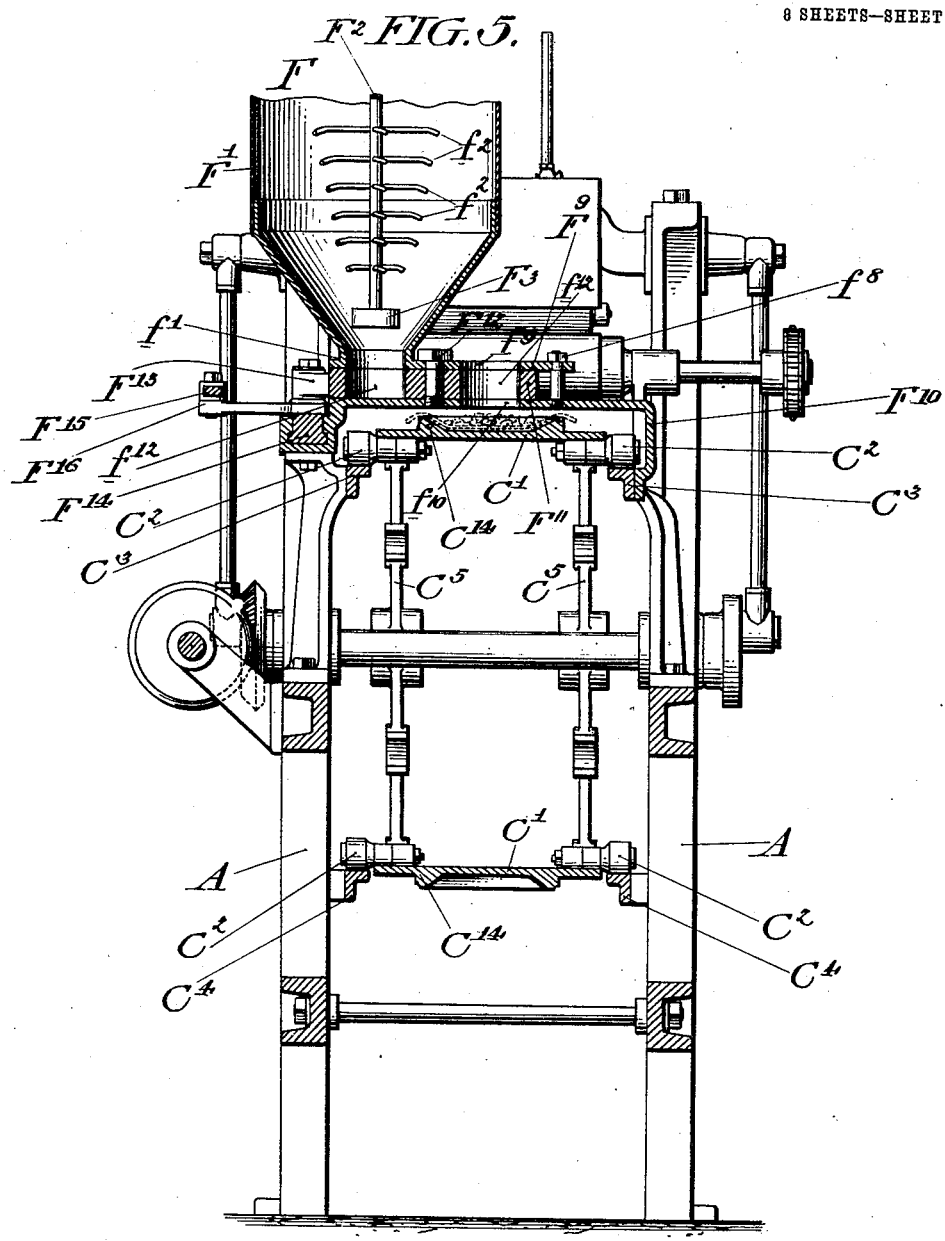
Figure 6:
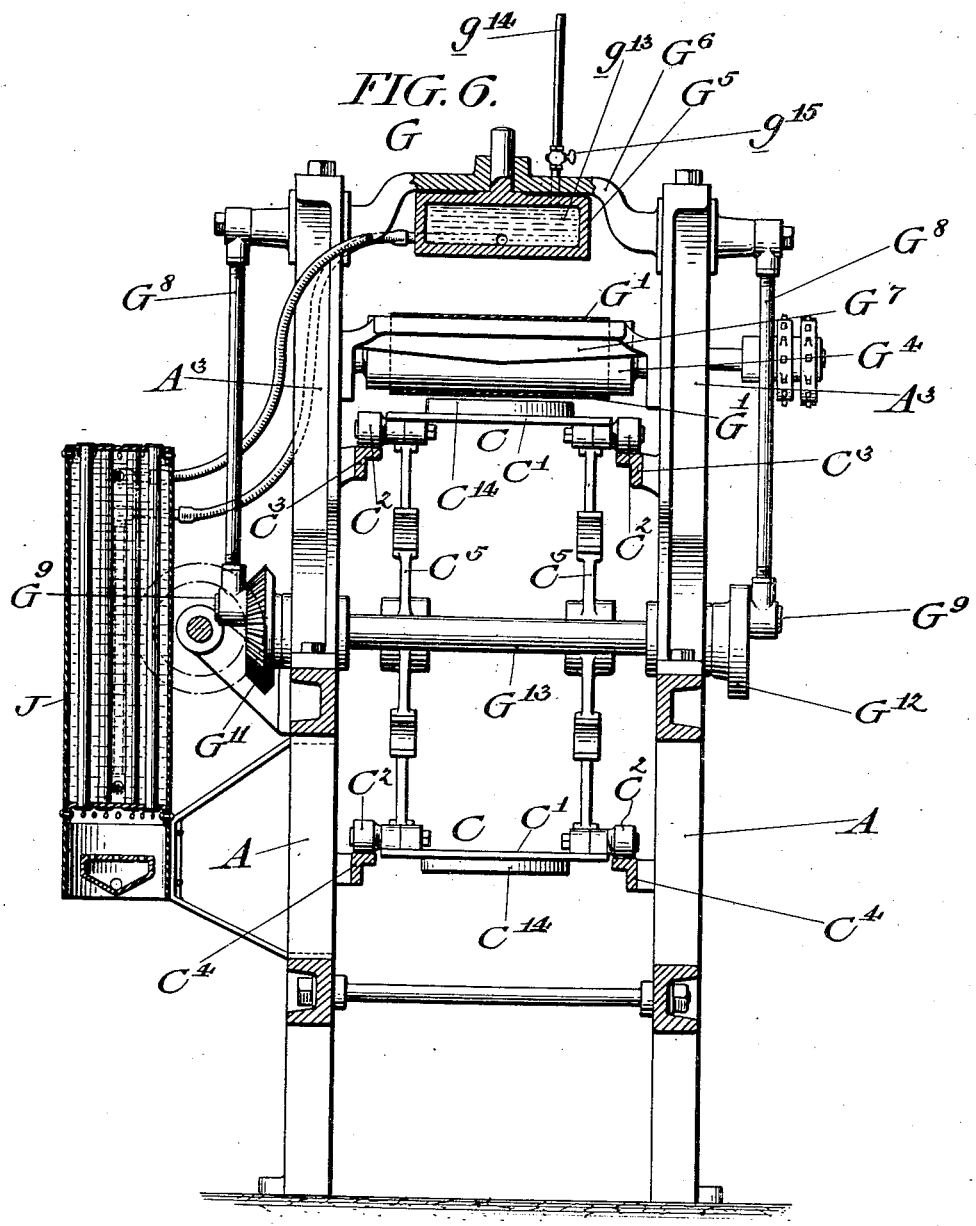
Figure 7:
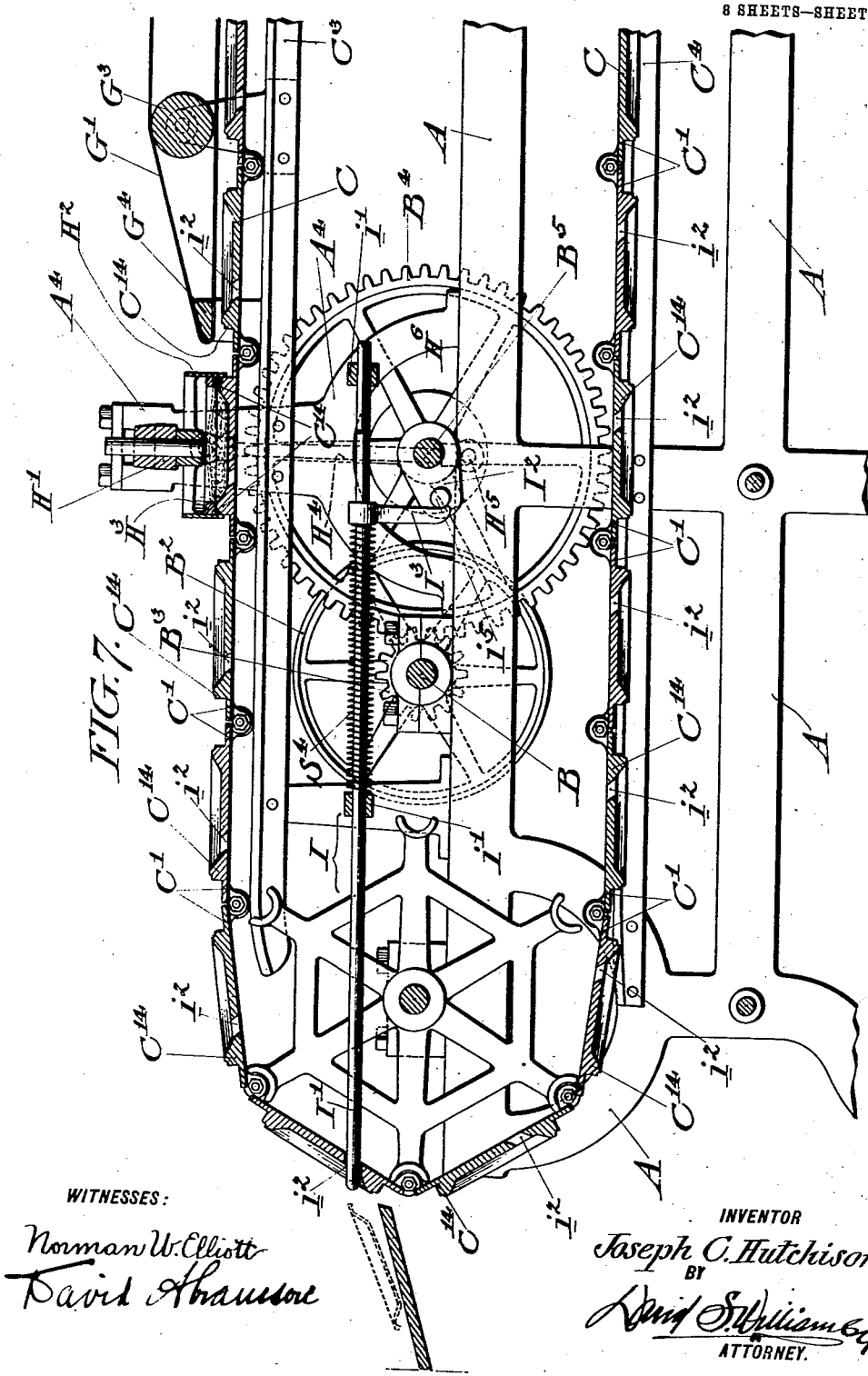
Figure 8:
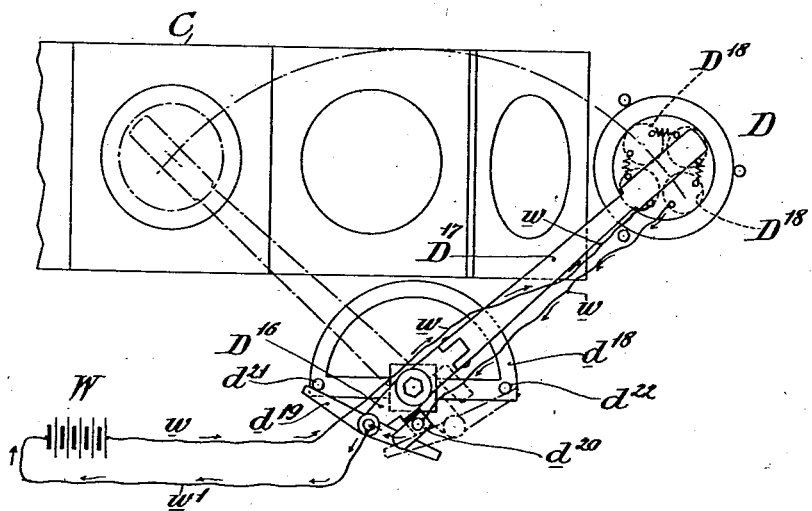
Figure 9:
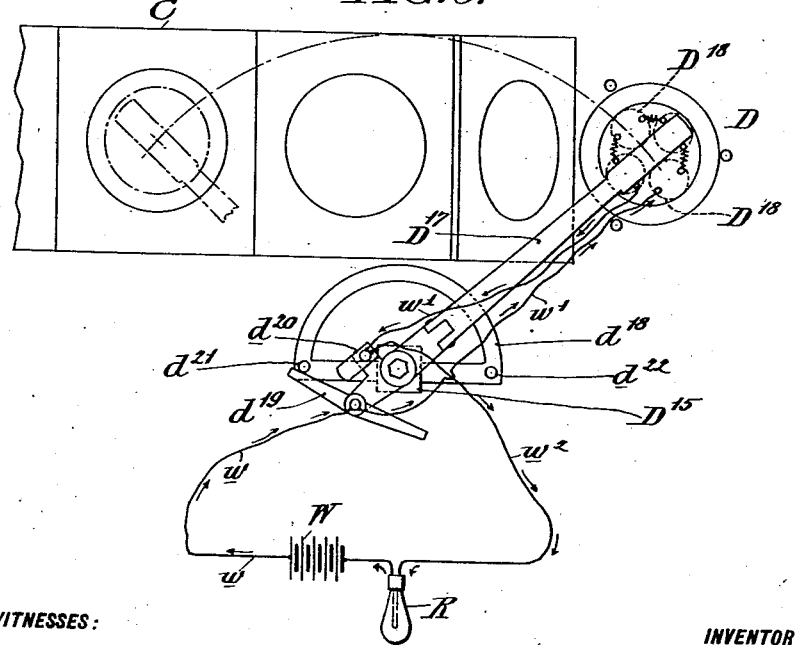

Figure 1 illustrates a side elevation of a machine embodying all the features of my invention. Fig. 2 is a plan view of the same with the upper portion of the filler mechanism broken away in order to better show its internal construction. Fig. 3 represents a front end elevation of the machine, at which point is located the plate-feeding mechanism. In this and in other similar views many of the parts which would be seen in the distance have been purposely omitted in order to avoid a confusion of lines and to more clearly set forth the parts the view is designed to illustrate. Fig. 4 represents a vertical section taken on a line 4 4 of Fig. 1, showing the construction of the lower-crust-forming plunger and the method of heating the same to prevent the dough from adhering to it. Fig. 5 is a vertical section taken on a line 5 5 of Fig. 1, showing the upper portion of the filler mechanism broken away and the lower portion in section. Fig. 6 shows a vertical section taken on a line 6 6 of Fig. 1 and illustrates the construction of the heating apparatus and the means employed to heat the plunger of the top-crust-forming mechanism. Fig. 7 represents a longitudinal section of the rear portions of the machine, taken on a line 7 7 of Fig. 2 and showing the mechanism for discharging the finished product from the conveyer; and Figs. 8 and 9 are diagrammatic views showing the paths of the electric circuit controlling the magnets of the plate-feeding mechanism.

Referring to the reference-letters of the drawings, A is the frame of the machine; B, the main driving-shaft; C, the endless conveyer; D, the plate-feeding mechanism; E, the lower-crust-forming mechanism; F, the filler mechanism; G, the upper-crust-forming mechanism; H, the trimming and crimping mechanism, and I the ejector mechanism.

The main driving-shaft B is provided, respectively, with fast and loose driving-pulleys B' and $B^2$, together with a pinion $B^3$, the latter of which meshes with a gear-wheel $B^4$, mounted upon a shaft $B^5$.

The endless conveyer C is formed of a number of plates or links C', which are hinged together and which have at the point of juncture rollers $C^2$, which are supported and guided upon rails $C^3$ and $C^4$ during the greater part of their travel. At the ends of the machine the conveyer is carried by sprocket-wheels $C^5$ and $C^6$, which are mounted, respectively, upon shafts $C^7$ and $C^8$, journaled in bearings $c^7$ and $c^8$, which are fastened to the frame A.

The shaft $C^7$, by which the conveyer C is driven, is provided with a ratchet-wheel $C^9$, operated by a lever $C^{10}$, which is fulcrumed upon the shaft $C^7$ and is provided with a spring-actuated pawl $c^{10}$ to engage the teeth of the ratchet-wheel $C^9$.

The lever $C^{10}$ is connected to a rod $C^{11}$, operated by a crank on the bevel-gear $C^{12}$, which is mounted upon the shaft $B^5$.

The plates C' of the conveyer C are each provided with a projecting ring or flange $C^{14}$, fashioned in such a manner as to form a neat-fitting support for a pie-plate, as well as an inner cutting edge for the crust-trimming die of the trimming and crimping mechanism.

The plate-feeding mechanism D comprises a bed-plate $D'$, supported upon brackets $D^2$, $D^2$, guides or uprights $D^3$, fastened to the bed-plate and serving as a means to keep a large number of plates in vertical alinement, and a plate-support $D^4$, upon which the plates rest and by which means they are elevated as the top plates are removed.

The plate-support $D^4$ is guided between the uprights $D^3$ and is provided with a centrally-disposed rack $D^5$, guided in the bed-plate $D'$ and acted upon by a pinion $D^6$, which receives motion through the medium of a train of gearing operated from the shaft $C^8$.

As shown in Figs. 1 and 3, the shaft $C^8$ is provided with a sprocket-wheel $D^7$, which carries a sprocket-chain $D^8$, engaging a somewhat larger sprocket-wheel $D^9$, mounted upon a shaft $D^{10}$ and journaled in bearings on the brackets $D^2$.

The shaft $D^{10}$ is provided with a pinion $D^{11}$, which meshes with a gear-wheel $D^{12}$, fastened to a shaft $D^{13}$, and by means of a clutch this shaft is caused to operate the pinion $D^6$ and in turn the rack $D^5$. When the plate $D^4$ has been carried upward to the full extent of its movement and the pie-plates have been removed therefrom, it is obvious that in order to repeat the operation the plate and its rack must be lowered and replenished with a new stock of pie-plates. In order to accomplish this, I mount the pinion $D^6$ upon a sleeve $d^6$, so that it may be free to slide upon the shaft $D^{13}$, and provide the sleeve with a handle $d^{17}$, by which means it may be manually operated to cause the pinion $D^6$ to engage or disengage the shaft $D^{13}$. The clutch which I prefer to use in this connection comprises a toothed collar $d^{13}$, pinned to the shaft $D^{13}$, and a correspondingly-toothed hub $d^7$, formed upon the pinion $D^6$, these two members being normally forced into engagement with each other by a spiral spring S, which surrounds the sleeve $d^6$ and is compressed between the pinion $D^6$ and the frame A.

The means which I employ for lifting the plates one by one from the pile and transferring them to the conveyer is accomplished as follows: Fastened to one of the frames A to the left of the machine, as shown in Fig. 3, is an arm $D^{15}$, which is provided at the top with a stud-bolt $d^{15}$, carrying a short arm $D^{16}$, to which is fulcrumed at a point $d^{16}$ a somewhat longer arm $D^{17}$, carrying a double set of electromagnets $D^{18}$. The arm $D^{16}$ receives its backward and forward motion by means of a connecting-rod $D^{19}$, which is fulcrumed to a crank $D^{20}$, fastened to an upright shaft $D^{21}$, which shaft is caused to rotate by a pair of bevel-gears $D^{22}$ and $D^{23}$, the former of which is secured to the shaft $D^{21}$ and the latter to a horizontal shaft $B^6$.

The shaft $B^6$ derives its motion from the shaft $B^5$ and the bevel-gear $C^{12}$ by means of a bevel-gear $C^{13}$, with which it is provided and which meshes with the bevel-gear $C^{12}$.

Returning to the plate-feeding mechanism, the arm $D^{17}$, it will be noticed, is provided near the point to which it is fulcrumed to the arm $D^{16}$ with a roller $d^{17}$, which rides upon a segmental cam $d^{18}$, which is fastened to the arm $D^{15}$. The object of this cam is to permit the magnets to be lowered sufficiently close to the top plate in the pile to attract the same when the magnets are at the receiving end of their travel, also to lift the top plate clear of the next in order as the arm moves in the direction of the conveyer. At the discharge side, or that to the left, (see Fig. 2,) the cam is also depressed to enable the magnets to discharge the plate as close to the conveyer as possible to assure the plates falling in proper alinement with the rings in the conveyer-sections. The arm $D^{16}$ is provided with a switch-lever $d^{19}$, fulcrumed to it, and also with an insulated contact-plate $d^{20}$, which the arm engages when the magnets are in position to pick up a pie-plate. The movement of the switch-lever $d^{19}$ is effected by means of projecting pins $d^{21}$ and $d^{22}$, the former of which, as shown in Figs. 2 and 8, serves to close the electric circuit and energizes the magnets to the point of lifting one of the pie-plates, while the latter serves to break the circuit and allow the pie-plates to fall to the conveyer.

In the two figures above mentioned the arrangement of the electric circuit is such that the current is open when the magnets are in the discharging position and closed when in a position to attract thus: Starting from the source of electromotive force, which I have indicated by the reference-letter W, the current would pass, say, over wire $w$, through the electromagnets $D^{18}$, and thence to the contact-plate $d^{20}$. Then if the magnets were in a receiving position the current would pass through the switch-lever $d^{19}$ and back over wire $w'$ to the starting-point.

In Fig. 9 I have illustrated a modified arrangement of the circuit which necessitates a reversal of the switch-lever and contact-plate by reason of the fact that current is never entirely broken, as in Fig. 8, but simply shunted by the action of the switch-lever and contact-plate. In this figure it will be readily seen that when the magnets are in a receiving position the current will pass, say, from W, over the wire $w$, to the switch-lever $d^{19}$, thence over wire $w'$ to the electromagnets $D^{18}$ and from there to the contact-plates $d^{20}$ and then along wire $w^2$, through resistance R, back to the starting-point. When the position of the arm carrying the electromagnets is reversed, as in the delivery position, the current through the wire $w'$ will be practically cut out or rendered so weak by the short circuit as to allow a plate carried by the electromagnets to drop to the conveyer.

The conveyer C after receiving a plate is carried forward to the extent of one link, and a piece of dough in the form of a cake or considerably less diameter than the crust it is to form is manually placed upon the pie-plate. The conveyer is then moved forward another step and the cake of dough is brought under the action of the lower-crust-forming mechanism E. This mechanism, as will be seen, comprises supporting-frames $A^2$, between which is firmly supported a bed-plate $E'$, arranged in line with and adapted to receive the greater part of the pressure imparted to the conveyer-plates. The supporting-frame $A^2$ also serves as guides to a cross-head $E^2$, which carries a plunger $E^3$, shaped so as to mold a crust of the requisite thickness in the pie-plate. The plunger $E^3$, as herein shown, is designed to be heated by hot water or steam generated in an independent reservoir or boiler and supplied by flexible connecting-tubes.

As shown in Fig. 4 of the drawings, the plunger $E^3$ contains an annular chamber $e^3$ for the reception of hot water or steam, preferably the former, which is heated in a reservoir J by a Bunsen burner $J'$ and conveyed to the plunger through a line of pipe $j$ and back again to the reservoir through a line of pipe $j'$. The plunger $E^3$ also contains an overflow-pipe $e^4$, which is open to the atmosphere when the heating device is being operated as a hot-water system, but which may be closed by a valve $e^5$ after allowing the air to escape in the event of the device being used as a steam-heating system. Located centrally within the plunger is a spring-pin $e^6$, which is acted upon by a delicate spiral $S'$ and serves to hasten the removal of a crust by pressing the same lightly forward and destroying a partial vacuum set up between the crust and plunger.

The cross-head $E^2$ which, is guided in the upper part of the frames $A^2$, is operated by connecting-rods $E^4$, fastened to crank-pins $E^5$, one of which, as shown in the drawings, is secured to the face of a bevel-gear $E^7$, while the other is secured to a crank-disk $E^8$. The bevel-gear $E^7$ and the crank-disk $E^8$ are both mounted upon a shaft $E^6$, which is rotated by the bevel-gear $E^7$, engaging a corresponding gear $E^9$, mounted upon the shaft $B^6$.

The filler mechanism F, which is adapted to supply a measured quantity of fruit or meat to the already-formed lower crust, comprises a hopper $F'$, fitted with bearing to receive a reciprocating rod $F^2$, provided at the bottom with a plunger $F^3$ and throughout a portion of its length with mixing-prongs $f^2$. This rod is operated from a shaft $F^4$ by a crank-disk $F^5$ and connecting-rod $F^6$, the said shaft being provided with a driving-pulley $F^7$, which by means of a belt $F^8$ may be driven from any convenient source of power.

The contracted lower portion or mouth $f'$ of the hopper is connected to or may form an integral part of a plate $F^9$, which, as shown, is supported above a bed-plate $F^{10}$ by bolts $f^8$ in such a manner as to allow snug-fitting space for a disk $F^{11}$, which is free to turn upon a pivot-bolt $F^{12}$. The disk just mentioned is provided in the present case with four holes $f^{11}$ $f^{11}$, &c., (although any number may be employed, if desired,) and these holes are adapted to receive a measured quantity of filler, which as the disk is rotated is discharged by gravity through an opening $f^{10}$, located directly over the medial line of the conveyer. In order to facilitate the discharge of filler through the opening in the bed-plate, the upper plate $F^9$ is provided with a hole $f^9$, which is located in alinement with one of the holes of the disk and that of the bed-plate at the point of discharge. The disk is provided with notches $f^{13}$, acted upon by a pawl $F^{13}$, which pawl is mounted upon a sliding bar $F^{14}$, guided in a portion of the bed-plate $F^{10}$.

The sliding bar $F^{14}$ receives its motion from the crank $D^{20}$ through the interposition of a connecting-rod $F^{15}$, which is fulcrumed to a bracket $F^{16}$, bolted to said sliding bar. The top-crust-forming mechanism G, the next in order, embodies an endless belt or apron $G'$, carried by rollers $G^2$ and $G^3$ and by an end plate $G^4$. These rollers are mounted, respectively, on shafts $g^2$ and $g^3$, which are properly journaled and are provided with sprocket-wheels $g^4$ and $g^5$, connected by a sprocket-chain $g^6$.

The shaft $g^3$ is provided also with a sprocket wheel $g^7$, which through the aid of a sprocket-chain $g^8$ and somewhat larger sprocket-wheel $g^9$ receives power from the shaft $C^7$. In addition to the above-mentioned features the top-crust-forming mechanism also embodies a crust-forming plunger $G^5$, secured to a cross-head $G^6$, which latter is guided in frames or uprights $A^3$, fastened to the body of the machine. Below the apron $G'$ is a bed-plate $G^7$, which extends across the machine and is fastened to the uprights $A^3$. This bed-plate serves to sustain the pressure of the plunger when a crust is being pressed upon the belt or apron $G'$.

The cross-head $G^6$ is provided with and operated by oppositely-disposed connecting-rods $G^8$, fulcrumed upon crank-pins $G^9$, one of which is connected to a bevel-gear $G^{11}$ and the other to a crank-disk $G^{12}$. Both of these parts are mounted upon a shaft $G^{13}$, driven by the engagement of a bevel-gear $G^{14}$ on the shaft $B^6$ with the above-mentioned bevel-gear $G^{11}$.

The plunger $G^5$, like that of the lower-crust-forming mechanism, is designed to be heated by hot water or steam, and is therefore, as shown in Fig. 6, made in the form of a hollow shell, containing an inner chamber G¹³ for the reception of the heating fluid, which chamber is brought into communication with the reservoir J by means of pipes $g$ and $g'$. The plunger is also provided with an overflow-pipe $g^{14}$, which is open to the atmosphere when the heating device is operated as a hot-water system, but which may be closed after allowing air contained in the plunger to escape in the event of the device being used in connection with steam by a valve $g^{15}$.

After the upper crust has been pressed the belt G' is moved a step forward and the crust is brought under the action of a marking-plate V. This plate is adjustably fastened to an arm V', which is bolted to the plunger G⁵, and its function is to mark the crust with a suitable letter denoting the kind of filler contained in the finished product. The plate V is provided with an arrangement of pegs $v$, which indent the crust and which are prevented from adhering to the same by means of a dusting device located at the side of the machine. This dusting device consists of a bellows V², mounted upon an upright V³, a hopper V⁴ to contain a quantity of flour, and a lever V⁵ for operating the upper lid of the bellows. The bellows V³ is expanded or pressed open by an internal spring S³ and is closed to force out a jet of flour upon the pegs of the marking-plate by a cam V⁶, fastened to the shaft B⁶.

The lever V⁵ is slotted out, so that it may be guided upon the shaft B⁶ in the well-known manner, and is provided with a roller $v^5$, which rests against the face of the cam.

The pie-crusts are next subjected to the action of the trimming and crimping mechanism, arranged as follows: Fastened to the main frame A of the machine are upright frames A⁴, serving as guides to a cross-head H', which carries a ring H², which ring is designed to sever the uneven edges of the crusts by closely engaging and passing downward over the rings or flanges C¹⁴ of the conveyer C. A second ring H³, secured within the first-mentioned rings, is designed to crimp the edge of the crust, and by so doing to unite the upper and lower crusts firmly together.

The cross-head H' is fulcrumed to rods H⁴, which are connected at their lower ends to crank-pins H⁵, one of which is connected to the bevel-gear C¹² and the other to a crank-disk H⁶ of the shaft B⁵. At the discharge end of the machine the pie-plates and their contents are removed by means of an ejector I, (see Fig. 7,) which embraces a horizontal bar I', mounted in bearings $i'$ $i'$ and operated in one direction by a spiral spring S⁴. The aforesaid bar is caused to move in the opposite direction against the action of the spring S⁴ by a crank I² on the shaft B⁵, which crank is provided with a pin $i^5$, adapted to act upon a dog $i^3$, fastened to the bar I'.

As will be noticed in the drawings, each of the links or sections of the conveyer is provided with a hole $i^2$, through which one end of the bar I' projects when in the act of discharging a pie-plate from the conveyer.

Having described my invention, what I claim, and desire to secure by Letters Patent, is—

1. In a machine of the character specified, a conveyer, a holder adapted to contain a number of pie-plates, and means for lifting a plate from the holder and depositing it upon the conveyer.

2. In a machine of the character specified, a conveyer, a holder for pie-plates, means for elevating the pie-plates and means for lifting the plates one at a time from the holder, and depositing them upon the conveyer.

3. In a machine of the character specified, a conveyer, a holder for pie-plates, means to elevate the holder and magnetic means for lifting the plates one at a time from the holder and depositing them upon the conveyer.

4. In a machine of the character specified, a conveyer, a holder adapted to contain a plurality of pie-plates, an electromagnet adapted to lift the plates from the holder and means for transporting the plates and depositing them upon the conveyer.

5. In a machine of the character specified, a conveyer, a holder for pie-plates, means for intermittingly raising the holder, a magnetic device for lifting the pie-plate from the holder, and means for transporting the plates and depositing them upon the conveyer.

6. In a machine of the character specified, a conveyer, a platform adapted to hold a plurality of plates, guides for sustaining the plates in position upon the platform, a rack-and-pinion motion for elevating the platform, means for intermittently turning said pinion, an electromagnet, means to energize said electromagnet to cause it to lift one of the plates from the platform, means for causing the electromagnet to move to and from the conveyer, and means to cut off the energy from said electromagnet.

7. In a pie-machine, an endless series of plate-holders provided with flanges which extend beyond the rims of the pie-plates contained therein, and a die having a depending flange adapted to coact with each of the flanges of the plate-holders to trim the edges of the pie-crust.

8. In a pie-machine, a conveyer having a series of plate-holders each of which is provided with a flange that extends beyond the rim of the pie-plate which rests in said plate-holder, and a die having a depending flange adapted to coact with said flange to trim the edge of the pie-crust.

9. In a pie-machine, a filler mechanism comprising a hopper, a horizontally-disposed disk arranged below the hopper and provided with a plurality of openings to receive a quantity of filler, and a casing surrounding the disk having a port through which the filler is conveyed to any one of the openings in the disk, a port through which a measured quantity of filler is discharged from the disk and a port to admit air to the opening in the disk as the filler is being discharged.

10. In a pie-machine, a filler mechanism comprising a hopper provided with a discharge-orifice, a horizontally-disposed disk provided with a plurality of openings to contain a measured quantity of filler and a plunger adapted to force the filler into any one of the openings in said disk.

11. In a machine of the character specified, an upper-crust-forming mechanism, an upper-crust conveyer, a marker and pneumatic means for dusting the marker, substantially as described.

12. In a machine of the character specified, an upper-crust-forming mechanism, an upper-crust conveyer, a marker, a bellows provided with a flour-hopper for dusting the marker and means for operating the bellows substantially as described.

13. In a machine for making pies, the combination with the crust-forming mechanism, a conveyer composed of a number of connected plate-holding dies closed at the bottom and having a centrally-disposed flange projecting upward from the body of the plate and adapted to the rim thereof substantially as described.

14. In a machine of the character specified, a conveyer mechanism for pie-plates composed of a number of plates, hinged together, each of which is provided with a projecting flange adapted to support a pie-plate and with an opening through which the pie-plates may be forcibly removed and a reciprocating ejector adapted to enter said opening and eject a pie-plate and its contents, substantially as described.

15. In a machine for making pies, a conveyer composed of a number of connected plate-holding dies closed at the bottom and provided at the top with a projecting flange adapted to support a corresponding portion of the plate, and a vertically-movable trimming and crimping die adapted to coact with the respective flanges of the conveyer to trim and crimp a pie-crust substantially as described.

16. In a pie-machine, a filler mechanism comprising a hopper provided with a discharge-orifice, a horizontally-disposed disk provided with a plurality of openings to receive a quantity of filler, and a reciprocating plunger adapted to force the filler into any one of the openings in said disk.

17. In a pie-machine, a filler mechanism comprising a hopper, a horizontally-disposed disk provided with a plurality of openings to contain a quantity of filler, and a ratchet mechanism for intermittently rotating said disk.

18. In a pie-machine, an endless series of plate-holders, each of which is provided with a perforation $i^2$ at its forward end, means for intermittently operating the plate-holders, and a horizontally-reciprocating rod adapted to be projected through the perforation in each plate-holder as said plate-holders are brought one at a time in proper position, whereby the plates are forcibly ejected from said plate-holders.

19. In a pie-machine, a filler mechanism comprising a hopper provided with a discharge-orifice, a rotatable disk provided with a plurality of openings to contain filler, a plunger adapted to press the filler into any one of said openings, and an agitator adapted to move in conjunction with said plunger.

20. In a pie-machine, a filler mechanism comprising a hopper, an agitator mounted within said hopper, a horizontally-disposed disk provided with a plurality of openings to receive a quantity of filler, means for intermittently rotating the disk, and a plunger adapted to force the filler from the hopper and into one of the openings of the disk substantially as described.

In testimony whereof I affix my signature in presence of two witnesses.

JOSEPH C. HUTCHISON.

Witnesses:
DAVID S. WILLIAMS,
ARNOLD KATZ.